DEFENSIVE PUBLICATION

UNITED STATES PATENT OFFICE

Published at the request of the applicant or owner in accordance with the Notice of Dec. 16. 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 29, 1970

878 O.G. 1149

T878,024
ENHANCED FILM HARDENING BY ULTRASONIC TREATMENT

Charles Allen Goffe and Robert L. Schneider, both of Kodak Park Division, Rochester, N.Y. 14650

Filed Apr. 9, 1970, Ser. No. 27,154
**Int. Cl. G03c *1/30***
U.S. Cl. 96—111
No Drawing. 7 Pages Specification

A process for substantially reducing hardness change in coated vehicles is disclosed. In one aspect, this invention relates to a process for substantially reducing hardness change in a hardenable layer or layers which consists of applying ultrasonic energy to the set layer or layers.

Photographic elements comprising a support, a photographic silver halide emulsion and a hardener can be improved according to this invention. In addition to hardening agents, photographic elements and emulsions can also contain other additives such as, for example, spectral sensitizers, speed-increasing materials, other hardeners, plasticizers and the like such as those described in Henn and Goffe, U.S. Pat. 3,128,180 issued Apr. 7, 1964,